E. J. WILLIAMS.
INDICATING AND SWIVEL SUPPORT FOR CAMERAS.
APPLICATION FILED JULY 25, 1911.
1,028,167.
Patented June 4, 1912.
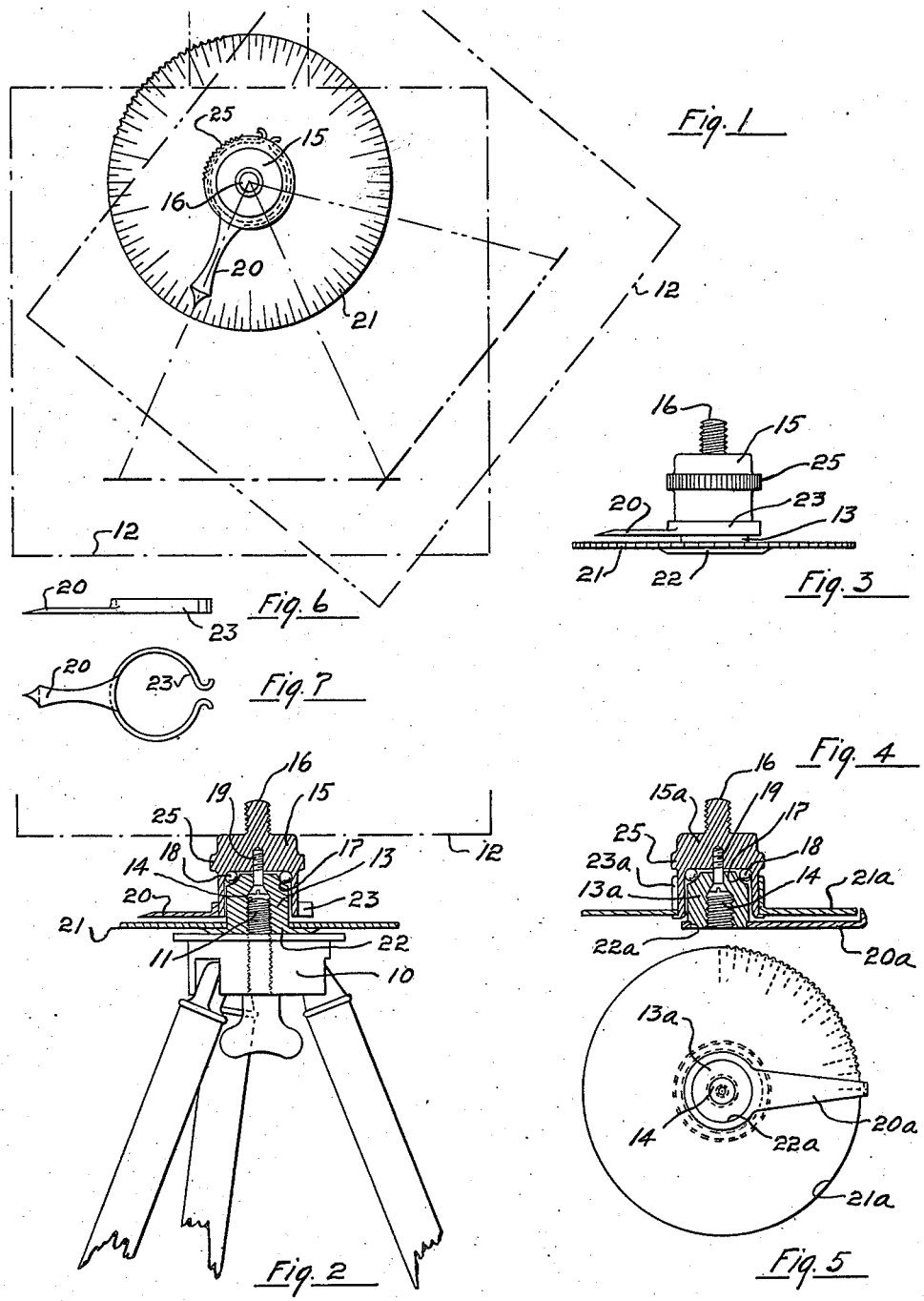
Witnesses:
L. N. Nicholas
Wm. R. Ackerman
Inventor
E. J. Williams
By his Attorney
H. C. Karlson

UNITED STATES PATENT OFFICE.

EDWIN JAMES WILLIAMS, OF MOUNT VERNON, NEW YORK.

INDICATING AND SWIVEL SUPPORT FOR CAMERAS.

1,028,167.  Specification of Letters Patent.  Patented June 4, 1912.

Application filed July 25, 1911. Serial No. 640,509.

*To all whom it may concern:*

Be it known that I, EDWIN JAMES WILLIAMS, a citizen of the United States, and resident of the city of Mount Vernon, in the county of Westchester and State of New York, have invented certain new and useful Improvements in Indicating and Swivel Supports for Cameras, of which the following is a specification.

This invention relates to a combined indicating and swivel support for cameras.

One of the objects of this invention is the production of a conveniently attachable device for cameras, by means of which may be taken a series of individual panoramic photographs with sharply defined side edges which will exactly coincide when the pictures are trimmed and placed side by side.

Another object is to produce a device which may be detachably applied to any type or size of camera without extra parts or elaborate preparations.

A further object is the production of an attachment in the nature of a swiveled and graduated mounting which may be applied to any ordinary tripod and to any ordinary camera, without necessitating the alteration of either.

A further object is the production of a small-sized, substantial device amenable to the simplest processes of manufacture.

To these ends the invention consists in the parts and combinations herein illustrated by means of certain specific embodiments and pointed out in the appended claims.

Reference will be had to the accompanying drawings, which are hereby made a part of this specification, and in which:

Figure 1 is a top plan view of the invention, the outline of the camera being shown by dot and dash lines in two positions; Fig. 2 is a vertical sectional view of the device, including a fragmentary front view of the tripod; Fig. 3 is a front view of the invention; Fig. 4 is a vertical sectional view of a modified form of the invention; Fig. 5 is a bottom plan view of Fig. 4; Fig. 6 is a detail front view of a spring clamp index; and Fig. 7 is a bottom plan view of Fig. 6.

In these views the numeral 10 indicates an ordinary form of tripod, having the usual camera-attaching screw 11; and 12 indicates the camera.

In its preferred embodiments the invention consists of an attachment adapted to be interposed between a tripod and a camera, and comprising two main parts. The socket member 13 is provided with internal screw threads 14 for engagement with the tripod screw. The member 15 is swiveled on the stationary supporting member or socket piece, and at its top carries a screw projection 16 for engagement with the usual screw socket in the bottom of the camera. Obviously, the screw projection 16 and the internally threaded socket in the stationary member 13 correspond. As shown, the socket member is a cylindrical piece, and the swiveled member 15 is in the nature of a barrel or sleeve receiving the socket member. To reduce friction, a raceway 17 may be formed around the top of the socket member 13 and bearing balls 18 may be placed therein to receive the thrust of the swivel member.

The members are held against separation by suitable means, such as the connecting screw 19, which is threaded up into the top of the barrel member 15, with its head received rotatably in the socket of the stationary member 13.

The members are provided with coöperating graduated and index means enabling the operator to rotate the camera through exactly equal arcs, or through arcs of any desired extent. In Figs. 1 to 3 and 6 and 7 is shown a pointer 20 carried by the swivel member 15, while a graduated dial 21 is carried by the socket member 13. In this instance, the pointer is located over the dial. In Figs. 3 and 4 is shown a pointer 20$^a$ carried by the socket member 13$^a$, while a dial 21$^a$ is carried by the swivel member 15$^a$. In this instance the pointer is located beneath the dial and has its tip turned up at right angles to coöperate with the graduations. In the first form of the invention, the dial 21 may be secured against a peripheral shoulder or flange 22 on the socket member 13. In the second form of the invention, the pointer 20$^a$ is preferably fixed to an annular recess or rabbet 22$^a$ on the socket member 13$^a$. It will be observed that the dial and the pointer, in both instances, are carried by the members at their lower parts, so as to be spaced materially below the top of the swiveled member 15 or 15$^a$, and therefore well below the bottom of the camera, so that the graduations and the pointer may be clearly and conveniently observed.

Either the pointer or the dial, or both, are rotatably adjustable on their members. In the first form of the invention, the pointer 20 is shown provided with a spring clip or resilient split collar 23, which clasps the barrel or swivel member 15. It is thus firmly held at any adjustment, but may be readily slipped around on its member when desired. In Fig. 4, the dial 21ª has a split collar 23ª similarly clasping the barrel member and similarly permitting rotatable adjustment of the dial. Obviously, the dial of Figs. 1 to 3 might be rotatably adjustable on the socket member 13, and the pointer 20ª of Figs. 4 and 5 might also be rotatable.

The periphery of the swivel member 15 or 15ª is provided with a knurled band 25, to facilitate screwing to the camera; and the periphery of the dial 21 may also be knurled or serrated to facilitate the screwing of the socket member 13 to the tripod.

In operation, the photographer first points the camera in the desired direction for the first picture. If the pointer does not then coincide with a graduation, as it probably will not, either the pointer or the dial, as the case may be, is rotatably adjusted until the pointer does coincide with a graduation mark. The first exposure is then taken, and a new plate or new section of the film is disposed behind the lens. The camera is now turned through an exact predetermined arc, measured by the pointer and the dial, so that the edge of the next picture will exactly match with the edge of the preceding. The procedure is continued until the complete panorama is taken, or so much of it as is desired.

My device can also be used for taking single views, eliminating the disadvantage of moving the tripod when the camera is leveled, but not quite in line with the objective point of view, by simply turning the camera on the ball bearing swivel support.

While, for purposes of illustration, I have shown and described certain specific and preferred embodiments of my invention, it will be understood that numerous changes may be made and numerous other forms may be produced, so that I reserve to myself all modifications within the scope of the appended claims.

Having described my invention, what I desire to claim and secure by Letters Patent is:—

1. A device for enabling the taking of panoramic photographs, comprising a stationary supporting member, a member swiveled thereon and constituting a rotatable support for a camera, being provided with means for attachment therewith, a graduated dial on one of said members, and a pointer on the other member, said pointer being adjustable relatively to both of said members.

2. A device for enabling the taking of panoramic photographs, comprising two members having swivel connection with each other, one member being provided with a threaded socket for engagement with a tripod screw and the other being provided with a corresponding screw for engagement with a camera, one member having a circular series of graduations and the other member having a coöperating index.

3. A device for enabling the taking of panoramic photographs, comprising a stationary supporting member, a member swiveled thereon and constituting a rotatable support for a camera, being provided with means for engagement therewith, means for holding said members against separation, a graduated dial carried by one of said members, and a coöperating pointer carried by the other member and adjustable thereupon.

4. A device for enabling the taking of panoramic photographs, comprising a stationary socket member provided with internal screw threads adapted to engage a tripod screw, a barrel member receiving said socket member and rotatably supported thereon, being provided at the top with a screw projection corresponding to the screw socket, for engagement with a camera, and a graduated dial and a pointer carried respectively by said members at their lower parts.

5. A device for enabling the taking of panoramic photographs, comprising a stationary socket member provided with internal screw threads adapted to engage a tripod screw, a member swiveled on the socket member and constituting a rotatable support for a camera, being provided with a screw for engagement therewith, and a dial and pointer carried by said members at their lower parts, spaced materially below the top of said swiveled member.

6. A device for enabling the taking of panoramic photographs, comprising a stationary socket member provided with internal screw threads adapted to engage a tripod screw, a barrel member swiveled on said socket member and having a screw projection on its top for engagement with a camera, a connecting screw having threaded engagement with said barrel member and its head rotatably received in the socket of said socket member, and a graduated dial and coöperating index carried by said members respectively.

7. A device for enabling the taking of panoramic photographs, comprising a stationary supporting member, a member swiveled thereon and constituting a rotatable support for a camera, being provided with means for engagement therewith, a graduated dial and an index carried respectively by said members, one of these parts being rotatably adjustable on its member.

8. A device for enabling the taking of panoramic photographs, comprising a stationary supporting member, a member swiveled thereon and constituting a rotatable support for a camera, being provided with means for engagement therewith, a graduated dial and an index carried respectively by said members, one of these parts having a collar frictionally engaging its member and permitting rotatable adjustment.

9. A device for enabling the taking of panoramic photographs, comprising a socket member provided with internal screw threads adapted to engage a tripod screw, a graduated dial fixed to the lower end of said socket member, a barrel member swiveled on said socket member, having a screw projection on its top adapted to engage with a camera, and a pointer provided with a collar frictionally clasping said barrel member.

Signed at the borough of Manhattan in the county of New York and State of New York this 24th day of July A. D. 1911.

EDWIN JAMES WILLIAMS.

Witnesses:
H. C. KARLSON,
W. H. GEE.

Copies of this patent may be obtained for five cents each, by addressing the "Commissioner of Patents, Washington, D. C."